United States Patent

Broughton et al.

[11] Patent Number: 5,920,849
[45] Date of Patent: Jul. 6, 1999

[54] SYSTEMS AND METHODS FOR EVALUATING BUILDING MATERIALS

[75] Inventors: W. Curtis Broughton, Littleton; Randal S. Hosler, Parker, both of Colo.

[73] Assignee: Quickpen International Corp., Englewood, Colo.

[21] Appl. No.: 08/786,917

[22] Filed: Jan. 22, 1997

[51] Int. Cl.$^6$ .............................. G06F 17/50; G06F 17/60
[52] U.S. Cl. ............................................................. 705/400
[58] Field of Search ................................ 705/10, 400, 29; 364/468.13, 468.14; 395/923

[56] References Cited

U.S. PATENT DOCUMENTS

| | | | |
|---|---|---|---|
| 4,181,954 | 1/1980 | Rosenthal et al. | 395/103 |
| 4,782,448 | 11/1988 | Milstein | 705/400 |

OTHER PUBLICATIONS

Quickpen International: Mechanical Engineering User Manual, Aug. 15, 1990.

George M. Llewellyn, "CAD and the HVAC contractor", Air Conditioning, Heating & Refrigeration News, v. 185, 4 pages, Jan. 20, 1992.

*Primary Examiner*—Emanuel Todd Voeltz
*Assistant Examiner*—Alexander Kalinowski
*Attorney, Agent, or Firm*—Townsend and Townsend Crew

[57] ABSTRACT

The invention provides systems and methods which assist a contractor in producing a competitive bid proposal. In one exemplary embodiment, a method is provided for producing a bid from at least one drawing including various items to be included in the bid. To produce the bid, the method relies upon a computer having a display screen, an entry device and a processor coupled to the display screen and the entry device. According to the method, at least one characteristic of a first and a second item on the drawing are entered into the processor. The processor then selects a fitting which connects the first and the second items based on the entered characteristics. A bid amount is then produced based at least in part on the cost of the first item, the second item and the fitting.

55 Claims, 11 Drawing Sheets

Fig. 4

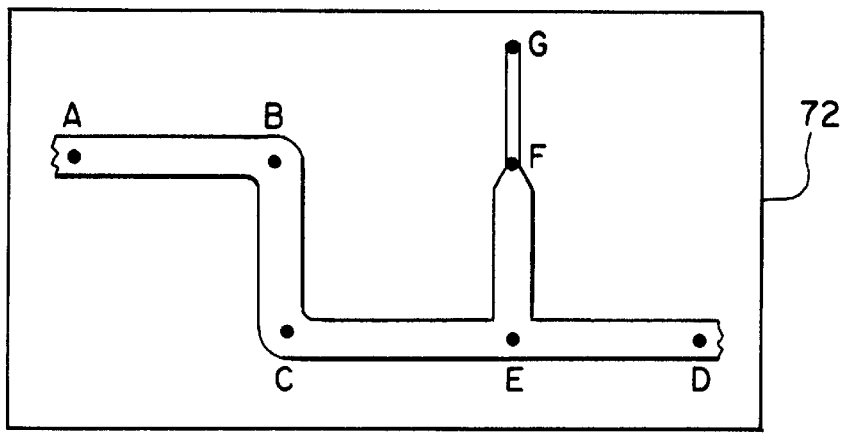

*Fig. 5*

| Table | |
|---|---|
| What You Touch | |
| A,B | duct, dimensions, length from A to B |
| C | duct, dimensions, length from B to C<br>elbow, dimensions, quantity − 1 at Point B |
| D | duct, dimensions, length from C to D<br>elbow, dimensions, quantity − 1 at Point C |
| E | — |
| F | tee, dimensions, quantity − 1 at Point E<br>duct, dimensions, length from E to F<br>reducer, dimensions, quantity − 1 at Point F |
| G | duct, dimensions, length from F to G. |

*Fig. 6*

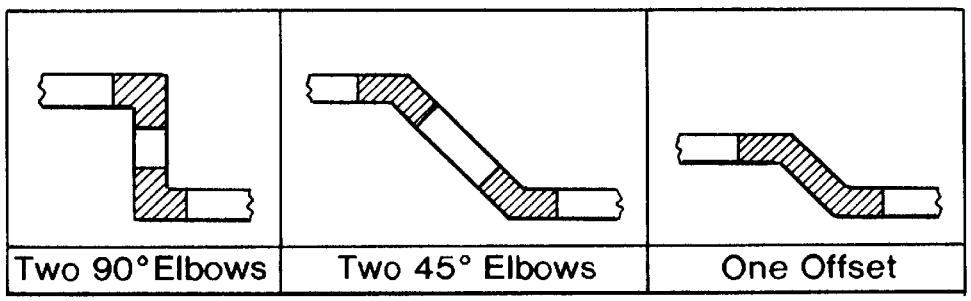

Sheet Metal Takeoff-Bid#12-sdf-123(Prototype #52)

Line# 20-Pi[

Correction Factors For Line #21 — 122

| Field Installation | | Field Material Handling | |
|---|---|---|---|
| Weather (Proj) | 1.01 | Weather (Proj) | 1.01 |
| 15th (Floor) | 1.02 | 15th (Floor) | 1.19 |
| Elevation: 16'-3" | 1.03 | Congestion | 1.04 |
| Congestion | 1.03 | | |
| Fake Demo 4 | 1.04 | | |
| Fake Demo 5 | 1.05 | | |

Select   Remove         Select   Remove

Total: 1.30 Use Factor [1.00]        Total: 1.00 Use Factor [1.00]

Shop Correction Factor [ ]          Shop Mat. Handling [2.234]

Hanger: 1.00 (Project + Floor + Structural Elevation)

✓ OK      X Cancel      ? Help

System
SDP
Pressure
Drawing
Floor
Zone
Symbol
Alt. Bid#  ○ Add
Item Pip  [48]

← Prev

21 Hot Spot

Start  □Notework P  □Delphi 2.0  □Database D  □Untitled Pnt  □Testtos  □ 3:39 P.M.

Customize on Screen Mouse Menu

| Duct. | Rct. Tee | Rct Tra | | 1 | 2 | 3 | 4 | 5 | | Tab. Label |
|---|---|---|---|---|---|---|---|---|---|---|
| Rad. Elb. | Rct. Tap | Sqr Rnd | | 6 | 7 | 8 | 10 | 12 | | Rectangular |
| Sq. Elb. | Offset | Cap | | 14 | 16 | 18 | 20 | 22 | | Class 0 |
| Angle | 3W Tee | Cross | | 24 | 26 | 28 | 30 | 32 | | New Fab. |
| Act. Elv | Trans El | FD | | 34 | 36 | 38 | 40 | 42 | | Delete Fab. |
| | | | | 44 | 46 | 48 | 50 | 52 | | Clear Fab. |

Rectangular / Round / Oval / Equipment

Current Button is. 134

- Cap
- Cross
- Cross–Reducing
- E–15 w/Reducer
- E–22.5 w/Reducer
- E–30 w/Reducer
- E–45 w/Reducer
- E–60 w/Reducer
- E–90 w/Reducer
- Elbow–15 Degree
- Elbow–22.5 Degree
- Elbow–30 Degree Clear | Post | Set as QTY Button Info Item Caption Shape
- ○ Follow
- ○ Oval
- ○ Round
- ○ Rectangular Duct | Spac.

Dimension

1

Post Dimension

Clear Dimension

✓ OK | ✗ Cancel

Start | Notework | Delphi 20 | Database | Untitled Pnt | Testtos | 3:42PM

SYSTEMS AND METHODS FOR EVALUATING BUILDING MATERIALS

BACKGROUND OF THE INVENTION

This invention relates generally to the field of contracting, and in particular to the creation of bid proposals used by a contractor in an attempt to secure a construction project. More specifically, the invention provides systems and methods which are particularly useful in assisting the contractor in producing a bid from representative drawings which illustrate the construction project.

One important aspect of a contractor's job is the procurement of construction projects. This is typically performed by having the contractor place a bid proposal for an upcoming project. The bid proposal is then compared with those submitted by other contractors. Based at least in part on this proposal, the client will select one of the contractors to complete the project.

When placing a bid, it is in the contractor's best interest to closely estimate the costs involved in completing the project. Such costs can include, for example, material costs, labor costs, insurance costs, and the like. Once these costs are determined, the contractor adds a profit margin to the estimated costs and submits this with the proposal. To help in producing the bid estimate, the contract is provided with representative drawings, such as blue-prints, which illustrate the project. From these drawings, the contractor needs to determine which parts and other materials will be needed to complete the project.

The amount of time and effort required to determine the parts and materials, as well as their associated costs, that will be needed for a project can be staggering. The amount of labor required to complete the project can also be difficult to determine since this is often directly tied to the particular parts and materials which are selected. Further, since a contractor will want to present a competitive bid while still being able to produce a profit, the contractor will want to determine the most cost effective parts and materials needed to complete the project. Moreover, the contractor will want to be confident that the estimates are accurate so that the most competitive proposal may be bid.

Hence, it would be desirable to provide systems and methods which would assist the contractor in determining the parts and materials that will be needed to complete a project. It would be further desirable if such systems and methods provided estimates relating to the costs of such parts and materials and the labor needed to install them. It would also be desirable if such systems and methods assisted the contractor in designing the system so that a minimal amount of parts and labor will be required or that the most cost effective materials may be chosen. Such systems and methods should also be accurate, easy to use and reduce the time and effort required by the contractor to produce the bid.

SUMMARY OF THE INVENTION

The invention provides systems and methods which assist a contractor in producing a competitive bid proposal. In one exemplary embodiment, a method is provided for producing a bid from at least one drawing including various items to be included in the bid. To produce the bid, the method relies on a computer having a display screen, an entry device and a processor coupled to the display screen and the entry device. According to the method, at least one characteristic of a first and a second item on the drawing are entered into the processor. The processor then selects a fitting which connects the first and the second items based on the entered characteristics. A bid amount is then produced based at least in part on the cost of the first item, the second item, and the fitting. In this way, a more accurate bid may be produced since the materials (and their associated prices) needed to complete the project will be determined by the processor. Further, by having the processor determine the the materials, labor and other costs, the time needed to produce the bid will be greatly reduced, thereby providing the contractor with more time to make bid proposals on other projects.

In one exemplary aspect, the entered characteristics include the cross sectional size and shape of the items. Additional characteristics, such as the length of the items and their positions relative to each other, may also be entered by moving the entry device near the first and the second items. Preferably, the entry device comprises a digitizer having a digitizing tablet and a pointer. The digitizer may comprise any device that is capable of producing x, y coordinates when actuated by the pointer. For example, the pointer may be moved to any location on the digitizing tablet and the digitizing tablet will produce an x, y coordinate for that location. In a further aspect, each item is marked with end points. In this way, the drawing may be placed onto the digitizing tablet and the pointer passed over the end points to transfer the lengths and positions of the items to the processor.

In one particularly preferable aspect, an image of the items is produced on the display screen in real time as they are transferred to the processor from the drawing. In this way, the user is able to see the drawing reproduced on the screen along with any added fittings. Additionally, a written description of the items and fittings will be displayed on the screen so that the user can see both a drawing and a written description of the items and fittings.

Exemplary items which may be used with the method include ducts, pipes, electrical conduits, cables, walls, trenching, fencing, curb and gutter, and the like, as well as any other linear item which experiences at least one angle change. As previously described, fittings are employed to connect or join items. Fittings may comprise any element capable of joining two or more of the same or different items, and may include, for example, elbows, "Tee" fittings, lateral fittings, tap fittings, wye fittings, conduit connectors, wall connectors, and the like. Another feature of the method is the determination of any peripherals that are needed to install the items in a building. For example, the processor may determine the number and/or type of connectors, hangers, liners, treatments, insulation, and the like that will be needed to install the items so that this information may be included in the bid.

One particularly important aspect of the invention is the automatic selection of the fitting type based on certain criteria. For example, the type of fitting may be automatically selected based on a change of elevation between the two items. When experiencing a change of elevation, the processor will preferably select a pair of fittings and a third item which connects the two items. As another example, the type of fitting may be selected based on a change of dimension between the two items. As still another example, the type of fitting may be selected based on a change of angle between two items. As a further example, in some cases it will be desirable to join more than two items. In such a case, the processor will determine the type of fitting based on the number of items to be joined together.

In another aspect of the method, an indicator, such as a circle or a square, will be displayed on the display screen at a location where the fitting is to be included. In this way, the location will be highlighted to let the user know where fittings will be needed. Such indicators will be removed from the screen or altered, e.g. by a color or a shape change, once the appropriate items which are to be joined by the fitting are entered into the processor and the processor has selected the fitting.

In some cases, it will be desirable to add another item to an existing fitting. The method of the invention allows a user to enter into the processor information indicating that a third items is to be joined to the fitting. Based on this information, the processor selects a modified fitting for the three items.

In another aspect of the method, the bid amount is further based on labor costs required to install the items and the fittings. The processor is employed to calculate the labor costs so that this information is automatically included in the bid. In a further aspect, the labor costs may be adjusted based on the height of the items from a floor of the building. This feature allows for a more accurate labor estimate since the amount of labor may vary depending upon the relative height of installment.

In still another aspect, the fitting is selected from a list of fittings that are stored in the computer based the entered characteristics. In yet another aspect, the method allows a user to enter additional items simply by moving the entry device near additional items on the drawings to transfer information identifying characteristics of the additional items into the processor. With this information, the processor will select the appropriate new fitting or modify an existing fitting.

In one particularly preferable aspect, the method will tailor the project so that only standard sized sections will be used to fabricate each item. This may be done, for example, by modifying the length of the fitting to accommodate the standard size section lengths.

The invention further provides an exemplary estimating system which comprises at least one drawing having various items to be included within an estimate. The system further includes a computer having a display screen, an entry device and a processor coupled to the display screen and the entry device. With this arrangement, the entry device may be employed to transfer information identifying characteristics of the various items from the drawing to the processor. In this way, the processor may select a fitting for connecting at least two items which have been entered into the processor.

The entry device employed by the system may comprise any one of, or a combination of, various entry devices such as a keyboard, mouse or a digitizer to directly read information from the drawing. Such entry devices allow various identifying characteristics, such as the cross sectional size and shape of the items to be entered in various ways. In one particularly preferably aspect, the identifying characteristics comprise the lengths and relative positions of the items. These characteristics are transferred by placing the drawing onto a digitizing tablet and moving a pointer near two ends of the item. This may be accomplished, for example, by providing each item with end points so that the pointer may be passed over the end points to transfer the lengths and positions of the items to the processor.

Another feature of the system is that it may be configured to produce an image of the items on the display screen in real time as they are transferred to the processor from the drawing. This allows the user to rapidly visualize what has been input. Further, the processor may be configured to produce a written description of the items and the fittings on the display screen.

In another aspect, the processor may be configured to determine any peripherals, such as connectors, hangers, liners, treatments, insulation, and the like, needed to install the items in a building. The processor may also be configured to determine the type of fitting based on a change of elevation between the two items, based on a change of dimension between the two items, or based on the number of items to be joined together.

In still another aspect, the processor is configured to produce indicators which are displayed on the display screen at locations where other fittings are to be included. Such indicators are removed or changed when at least two items which are to be joined to the fitting are entered into the processor and the processor has selected the fitting. In the event that another item is to be joined to the fitting, the processor will select a modified fitting upon receiving an entry of information indicating that a third item is to be joined to the fitting The system of the invention is versatile in that it various items may be input, such as, for example, ducts, pipes, electrical conduits, cables, walls, trenching, fencing, curb and gutter, and the like, as well as any other linear item which experiences at least one angle change. In another aspect of the system, the computer includes information on the cost of the items, the fittings, and the labor required to install the items and the fittings. In this way, the processor may produce a bid amount based at least in part on the costs of the items, the fittings and the labor. Further, the processor may adjust the labor costs based on the height of the items from a floor of the building. In still another aspect, the processor is configured to select the fitting from a list of fittings that are stored in the computer based at least on part on the shape and the size of the items to be attached. In still another aspect, at least some of the items comprise standard sized sections which are attached by connectors. With this arrangement, the processor adjusts the type of fitting to allow the item to be formed from only standard sized sections.

BRIEF DESCRIPTION OF THE DRAWINGS

FIG. 4 is another window from the display screen of the invention which allows for the editing of data.

FIG. 5 illustrates an example of a drawing from which certain information is to be transferred into a processor to produce a bid estimate.

FIG. 6 is a table which illustrates the data which will be displayed by a computer when the information from FIG. 5 is entered into the processor.

FIG. 7 illustrates three examples of fitting arrangements which may be selected by the processor to produce an elevation change.

FIG. 10 is still another window from the display screen which allows for the input of various correction factors used to adjust the bid estimate.

FIG. 12 is still yet another window from the display screen which assists a user in entering various information with a mouse.

FIG. 13 is a further window from the display screen which allows a user to customized the window of FIG. 12.

DETAILED DESCRIPTION OF THE SPECIFIC EMBODIMENTS

The invention provides systems and methods which assist a contractor in producing a bid estimate. One important aspect of the invention is that the estimate may be produced by simply transferring selected information from representative drawings to a processor which, among other features, automatically calculates the necessary fittings, optimizes the design, calculates the necessary peripheral items needed for installment, and calculates the necessary labor. Based on these calculations, the processor will then produce a bid estimate for the contractor.

One particular advantage of the invention is the ability to display in real time an image of the items transferred from the drawings on a display screen. In this way, a user is able to visualize an image of the items as they are transferred into the processor so that the user can quickly determine what items have been entered and which items remain to be entered. Further, as the items are entered, the necessary fittings are automatically determined by the processor, thereby minimizing user error as well as the time required by the user to manually determine the proper fittings. Another advantage is that the fittings may be modified when additional items are added to an existing fitting. For example, a "Tee" fitting may be automatically modified by the processor to a cross fitting when a fourth item is to be joined. Conveniently, the computer may produce visual indicators on the display screen at locations where additional information needs to be entered by the user so that the proper fitting may be determined. Once the fitting is selected, the indicator is either removed or changed to notify the user that the appropriate information has been entered.

Another particular advantage of the invention is that it may be used with a wide variety of applications. For example, the invention is able to produce bid estimates for a wide variety of items that are to be included within a bid, including sheet metal items, such as ducts, plumbing, pipes, electrical conduits, cables, walls, trenching, fencing, curb and gutter, and the like, as well as any other linear item which experiences at least one angle change. In this manner, a contractor who is competing for a project having a diverse assortment of items will be provided with a way for producing an accurate bid estimate.

Figure 1:
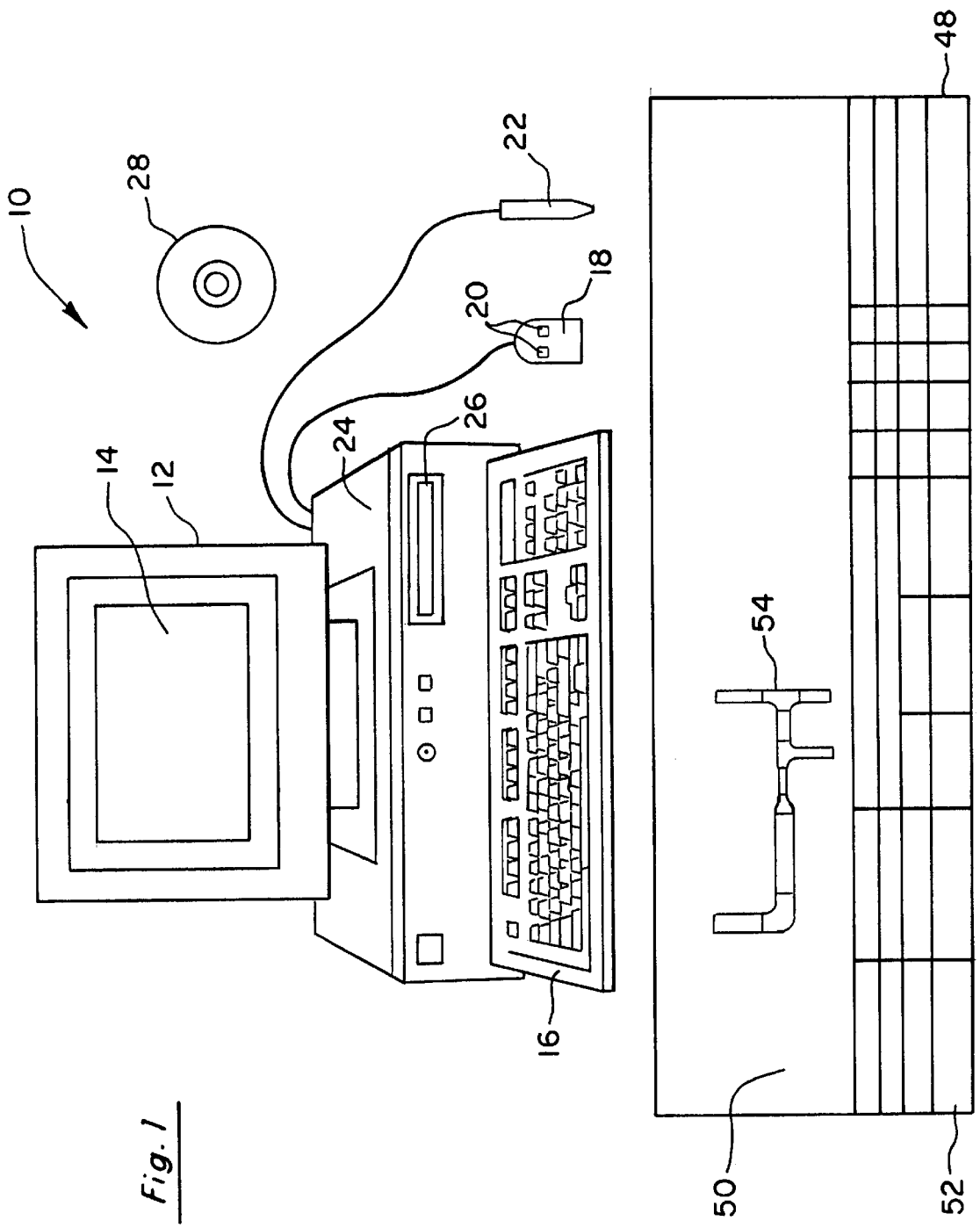
FIG. 1 illustrates an example of a computer system used to execute software of an embodiment of the present invention.

Referring now to the drawings, the systems and methods of the invention will be described in greater detail. Referring first to FIG. 1, an example of a computer system 10 used to execute software of an embodiment of the present invention will be described. Computer system 10 includes a monitor 12, a screen 14, a keyboard 16, a mouse 18 (which may have one or more buttons such as mouse buttons 20) and a pointer 22. As described in greater detail hereinafter, pointer 22 is used in connection with a digitizing tablet to allow x, y coordinates to be entered into the computer. Computer system 10 further includes a cabinet 24 which houses a CD-ROM drive 26, a system memory and a hard drive (see FIG. 2) which may be utilized to store and retrieve software programs incorporating computer code that implements the present invention, data for use with the present invention, and the like. Although a CD-ROM 28 is shown as an exemplary computer readable storage medium, other computer readable storage media including floppy disks, tape, flash memory, system memory, and hard drives may be utilized. Accordingly, CD-ROM drive 26 may be substituted with a suitable read/write device. Cabinet 24 also houses familiar computer components (not shown) such as a central processor, system memory, a hard disk and the like.

Figure 2:
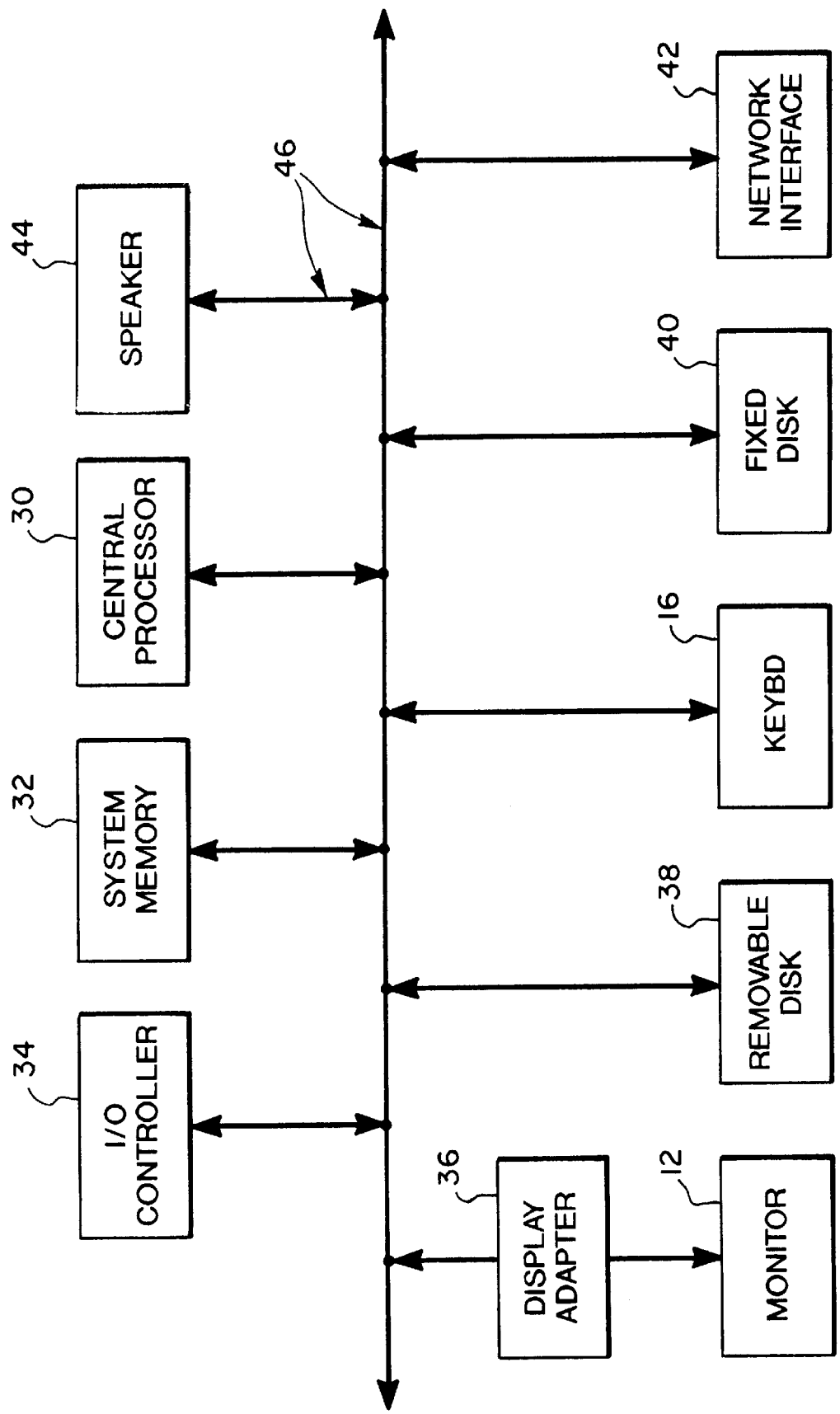
FIG. 2 illustrates a system block diagram of the computer system of FIG. 1.

FIG. 2 shows a system block diagram of computer system 10 used to execute the software of an embodiment of the present invention. As in FIG. 1, computer system 10 includes monitor 12 and keyboard 16. Although not shown, it will be appreciated that the system block diagram of FIG. 2 could also include a block for mouse 18, a digitizer or other input devices. Computer system 10 further includes subsystems such as a central processor 30, system memory 32, I/O controller 34, display adapter 36, removable disk 38 (e.g., a CD-ROM, flexible magnetic media or the like), fixed disk 40 (e.g. hard drive), network interface 42, and speaker 44. Other computer systems suitable for use with the present invention may include additional or fewer subsystems. For example, another computer system could include more than one processor 30 (i.e., a multi-processor system) or a cache memory.

Arrows such as 46 represent the system bus architecture of computer system 10. However, these arrows are illustrative of any interconnection scheme serving to link the subsystems. For example, a local bus could be utilized to connect the central processor to the system memory and display adapter. Computer system 10 is shown in FIG. 2 as but an example of a computer system suitable for use with the present invention. Other configurations of subsystems suitable for use with the present invention will be readily apparent to one of ordinary skill in the art.

Referring back to FIG. 1, a more detailed description of the various entry devices will be described. FIG. 1 illustrates a digitizing tablet 48 which is used in association with pointer 22 to enter various information into system 10. Conveniently, digitizing tablet 48 is divided into a drawing portion 50 and a data or menu portion 52. As described in greater detail hereinafter, data or menu portion 52 may be customized to accommodate specific applications.

In drawing portion 50, an example of a drawing 54 is shown. Such a drawing will typically be a blueprint showing a section of the construction project. To transfer certain information from drawing 54, pointer 22 is touched or held over certain portions of drawing 54. The digitizing tablet 48 then converts this information to x, y coordinates and transfers the information to the processor. A more detailed description of this process will be described hereinafter. An exemplary digitizer is commercially available from GTCO CORPORATION, Columbia, Md.

Data portion 52 may be conveniently provided with certain data, such as numbers, fittings, menu settings, equipment, and other commands, such as various Windows commands, which may be selected with pointer 22 to enter the information into the processor. Alternatively, it will be appreciated that keyboard 16 and mouse 18 may also be used to enter in information to the processor. However, the entry of certain data, such as information from drawing 54, will be greatly facilitated by use of pointer 22.

Figure 3:
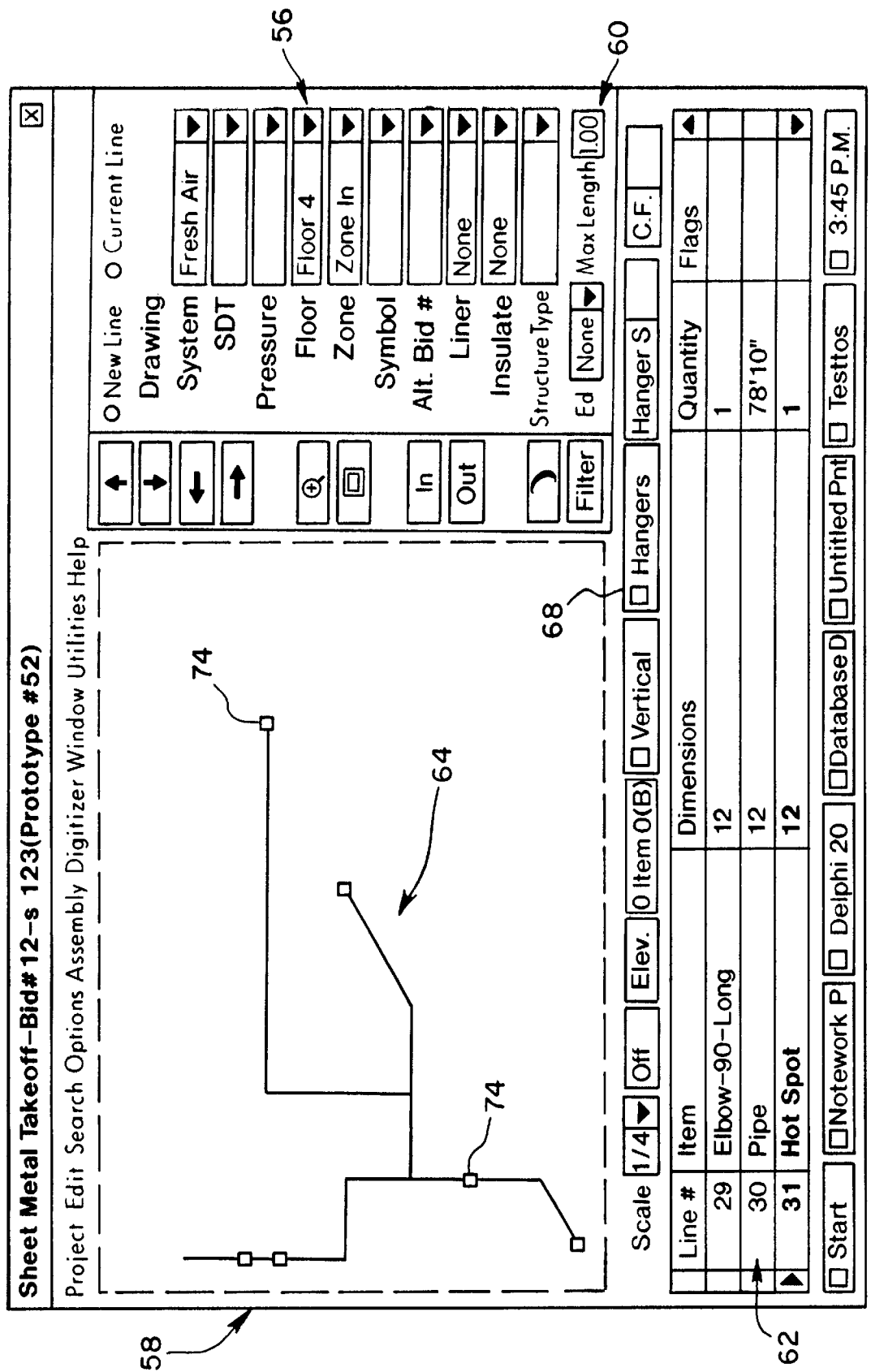
FIG. 3 is an exemplary window from a display screen of the invention having a portion for displaying entered drawings, a portion for displaying written descriptions of both entered and calculated data, and a portion which summarizes the system setup.

FIG. 3 shows a home window 56 as it would appear on display screen 14 of computer system 10 of FIG. 1. Home window 56 (as well as the other windows described hereinafter) is generated in response to the execution of an application program for producing a bid estimate. As shown, home window 56 includes a drawing region 58, a system summary region 60 and a written description region 62. Drawing region 58 is used to display in real time an image of a drawing 64 that is transferred from a drawing of drawing portion 50 of digitizer menu 48. Drawing 64 is displayed in real time so that as each element from a representative drawing is selected with pointer 22, the corresponding item is displayed on drawing 64. For convenience, drawing region 58 includes a variety of tabs which may be selected to reposition drawing 64 and/or to increase or decrease its size.

Written description region 62 provides a detailed description of each item that is displayed in drawing 64. This allows a user to both visualize the item on the drawing and to see a written description of its characteristics. By way of example, each item may be assigned a name, may be numbered, and may have a description of its dimensions, such as its cross-sectional dimensions and length. As shown, description region 62 also includes various flags which are associated with the item. These flags may comprise peripherals that are needed to install the items or other information. For example, the flags may indicate whether the item has hangers, joints, a liner, whether there will be shop fabrication, whether the item is running vertical or horizontal, or may simply provide various notes. Advantageously, such flags can be employed by the processor to adjust the bid estimate. For example, if a liner and several hangers are required, these materials may be included in the bid estimate.

System summary region 60 displays a summary of the system setup so that the user can conveniently visualize various parameters associated with drawing 64 which is displayed on region 58. This information is typically input from a separate window (not shown) when beginning a new project and will be described in greater detail hereinafter.

At the top of home window 56 is a row of menu items which may be selected to produce various pull-down menus or windows. Several of the features from these menus or windows will be described in greater detail hereinafter. Positioned just above the written description region 62 is a settings panel 68 which displays various peripheral items needed to complete the project. The associated boxes may be checked to have the processor automatically calculate the number and size of selected peripherals and include these in the estimate. When calculated, such peripherals are displayed in the written description region 62 as previously described.

The following is a brief summary of the types of peripheral items that may be selected. When the hangers box is selected, the processor will determine the number and length of hangers needed to install an item. Further, to assist in determining the particular type of hangers, it will be desirable to provide the processor with information regarding the elevation of the item. This information may be entered separately as described hereinafter. When the joint box is selected, the processor will automatically determine what joints are needed based on joint specifications which may be entered by the user. If the liner box is selected, the liner will automatically be calculated based on previously input liner specifications. When selecting the vertical box, the system will note a vertical rise or change in direction of the item. This will then prevent the system from calculating hangers for that section of the item. The insulate box may be selected to have the processor automatically calculate the type of insulation needed. Finally, the treatment box may be selected to determine what type of treatment will be used. Such treatments may include, for example, painting, polishing, and the like. For example, the user may select none, inner, outer, or in/out for both inner and outer treatment.

When beginning a new project, information summarized on region 60 will need to be entered. This may conveniently be done by pulling down a project menu from home window 56 and entering the name of the project. The system and drawing number may then be selected from a pick list. The user may also enter the floor number for the drawing from a pick list as well as other information. Once the appropriate information has been entered, a user is ready to begin transferring information from a representative drawing to begin producing the estimate.

Figure 4:
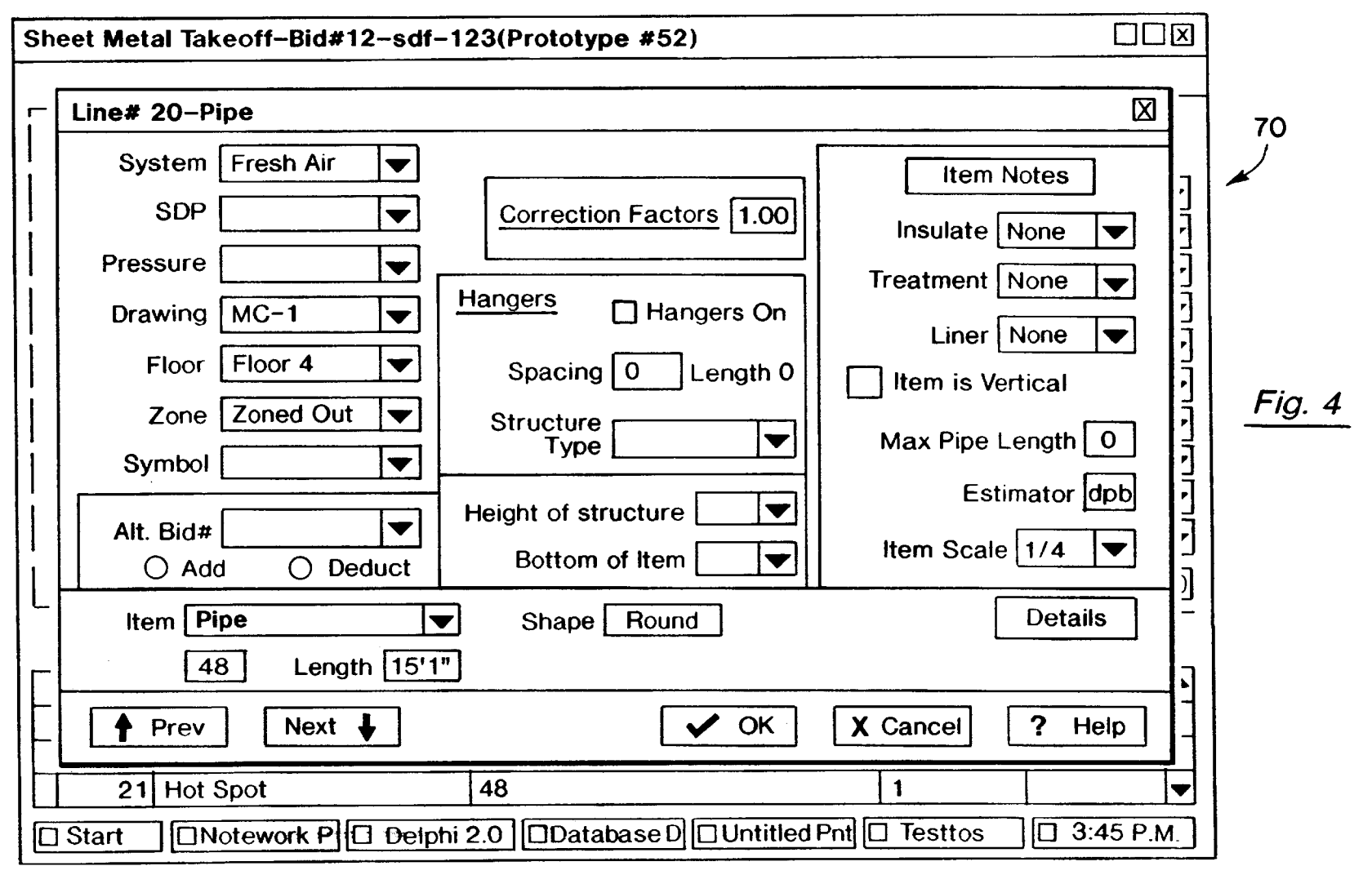

At any time, the user may want to edit an item specifications. This may be done by pulling down an edit window 70 as shown in FIG. 4. Edit window 70 includes all information relating to a single item. In this manner, the user can easily change an item's shape, quantity, dimensions, correction factors (which will be described hereinafter), scope information or peripheral items. Since all of the information relating to a single item may be found at one place, the user can save considerable time in editing an item's specifications from a single screen.

Referring now to FIGS. 5 and 6, one exemplary example of how a user would input information into computer system 10 from a drawing so that the system 10 can automatically calculate various fittings, any necessary peripherals and associated costs so that a bid estimate may be produced will be described. FIG. 5 illustrates a portion of a drawing 72 which would typically be part of a larger blueprint for a particular area on a specified floor. Drawing 72 would typically be placed on drawing portion 50 of digitizing tablet 48 (see FIG. 1). The process begins by having the user entering characteristics of a first item from drawing 72. This will typically be done by entering into system 10 the item's name, such as a duct, pipe, electrical conduit, and the like. Such information may be entered using keyboard 16, mouse 18 or pointer 22 in combination with data or menu portion 52 of digitizing tablet 48. For convenience of discussion, the items in drawing 72 will be referred to as ducts. The user also enters into system 10 the duct's cross-sectional dimension with any of the previously mentioned entry devices. Using pointer 22, the user then begins transferring information directly from drawing 72 to system 10. This is best done by touching the various points on drawing 72 with pointer 22. For example, the user may first begin by touching points A and B on the selected duct.

As illustrated in FIG. 6, various information will be displayed on written description region 62 (see FIG. 3) after touching points A and B. This information will include the name of the item, i.e. a duct, its cross-sectional dimensions, and the length from A to B. At the same time, a line will appear on drawing region 58 (see FIG. 3) to illustrate the duct. The user then touches point C on drawing 72 and a second line will appear on drawing region 58 to illustrate the second duct. Also, descriptive information will be provided on written description region 60 including the name of the second duct, its dimensions, and the length from B to C. Further, the processor will automatically determine that an elbow will be needed to join the two ducts and will list the elbow, its type, dimensions and quantity.

The user then continues on by touching point D on the duct. Another line will appear on drawing region 58 and a written description will appear on region 62. This information will indicate that the item is a duct, its dimensions, the length from C to D. Also, region 62 will show that an elbow is needed at point C and will give its dimensions.

The user then touches point E and point F and system 10 will automatically determine that a "Tee" fitting is needed and will give its type as well as its dimensions and quantity. Also, a description of the duct, its dimensions and the length from E to F will be shown. At point F, the dimensions of the duct are reduced. To proceed, the user enters (using one of the entry devices) the smaller duct's cross-sectional dimensions. The user then touches point G to show the duct on drawing region 58 and to provide a new line on written description region 68 describing the required reducer, its type, dimensions and quantity. Region 68 will also describe the name of the item, its dimensions and length from F to G.

Hence, by using pointer 22, the user can rapidly transfer information from drawing 72 into system 10 which will in real time will display a graphical image of the drawing and will automatically calculate and display the required fittings and any peripherals. Another important feature of system 10 is that it will also optimize the design so that the most cost effective parts may be used. For example, most ducts come in standard sized sections. These are joined by connectors to create an appropriate length of duct. System 10 is able to calculate an adjustment to the length of the fitting so that only standard sized sections of duct will be needed. This helps reduce waste material and lowers overall costs for materials and labor.

Often, the items in a drawing will experience a change in elevation. System 10 is able to accommodate this change and will automatically calculate the required fittings to accomplish the elevation change. For example, by way of illustration, drawing 72 of FIG. 5 may include a change in elevation at point C. With such a scenario, the user simply touches point C and then enters an elevation change. System 10 will then automatically calculate the length of the elevated duct and the appropriate fittings. Examples of three types of fittings that may be employed to adjust the height are shown in FIG. 7. By way of example, system 10 may select two 90° elbows, two 45° elbows or one offset. The user may enter a preferred arrangement into system 10 so that the system will chose the preferred arrangement.

System 10 will preferably be configured to select the appropriate fitting from a list of fittings stored within the computer. Based upon the entered characteristics for two items which are to be joined, the processor will select the appropriate fitting and show this on written description region 62.

The user may also enter various pieces of equipment into system 10 that are included in a drawing. Such equipment can include, for example, air conditioners, heaters, and the like. This information can be selected from pick-lists stored in the computer and may be entered from the touch menu 52 or using a mouse menu as described hereinafter.

As illustrated in FIG. 3, various indicators 74 are shown on drawing 64. For convenience of discussion, indicators 74 may also be referred to as "hot spots" which indicate to the user that additional information needs to be entered before the computer can calculate labor or costs for that item. Such indicators may be configured to have a variety of geometries, sizes or colors which may be changed or removed when the necessary information has been entered. As one example, an indicator 74 may be displayed at the beginning or end of a run of duct. When a connecting duct has been entered and the appropriate fitting has been calculated the hot spot will be removed or altered. Indicator 74 may also be displayed at locations where there is a change of size or direction.

Another important feature of the invention is that a user can add to an existing drawing at any time. This is referred to as the "start from" feature. Using the "start from" feature, if only a portion of the drawing has been entered, the user may at any time begin touching additional points to create new runs of ducts and to have the computer calculate the appropriate fittings. For example, if three runs of ducts have been entered and "Tee" fitting has been calculated, the user may select a fourth point to create a fourth duct, with the processor automatically modifying the "Tee" fitting to a "cross" fitting. Conveniently, the user may display one of the pull down menus to assist in entering various information, such as the shape of the new item and its dimensions when adding to an existing drawing.

A more detailed description of the "start from" feature when beginning from a location which does not include a hot spot is as follows. For convenience of discussion, reference will be made to drawing 72 of FIG. 5 to describe this feature. To begin, a user moves pointer 22 to a point on drawing 72 where a new item is to be added. For example, assuming information from points C and D have previously been entered, the user selects a location represented by point E wherein a new item is to be added (it being appreciated that points C, D, and E on drawing 72 are shown only for purposes of illustration). The processor then searches through all items on the drawing that have previously been entered to find an item that is near to the selected point. In this example, the item would be the item between points C and D. This is then labeled as the "start from" item. A hot spot is then inserted at point E on the display screen and a new "length" item matching the "start from" item is produced. The hot spot is assigned the coordinates of the "start from" point (point E). The new "length" item is then assigned a second end point (point C) which is equal to the second end point of the "start from" item (point C). The new "length" item is also assigned a first end point (point E) which is equal to the hot spot coordinates. The "start from" item is then changed so that its second end point matches the hot spot's coordinates (point E). A new length is then calculated for the "start from" item (in real world feet or meters) using the actual distance between its new end points (points D and E) and its scale setting. A real world length is then assigned to the new "length" item which is equal to the original "start from" item length minus the new calculated length for the "start from" item. This length is then converted to real world feet or meters based on its scale setting. In this way, the new "length" item will be from points C to E and the "start from" item will have a length from E to D. At this point, the hot spot (point E) becomes the new "start from" item from which the user may add an additional item.

To add the additional item, the user continues by touching another point on the drawing with the pointer 22. For example, in FIG. 5, the user will select point F. Optionally, the user may also enter new dimensions for the new item that they wish to enter. The "start from" item is then loaded into RAM and its number of openings is increased by one. If the user has entered a new dimension or dimensions prior to touching a "start from" point (point F), the dimensions for the new opening will be set equal to the entered dimensions. Otherwise, the dimensions for a new opening will remain equal to the dimensions of the item's first opening. The processor then determines the angle between a line joining the "start from" item and the new point just selected and a line from C to D. If the angle is near perpendicular, the new point will be adjusted so that it is exactly perpendicular and the angle will be set to 90°. Alternatively, if the angle is near to 180°, the new point is adjusted so that it lies on the same line and the angle is set to 180°.

If the "start from" item is a hot spot, such as point E in FIG. 5, and the angle is 90° the hot spot is converted to a correct type of fitting, e.g., a "Tee" fitting. Otherwise, the hot spot will be set to a lateral, a tap, a wye-type fitting, or other appropriate fitting, depending upon the user's settings. Alternatively, if the "start from" item is a reducer (concentric or eccentric), and if the angle is near 90°, the item is set to a correct type of reducing fitting, e.g., a reducing Tee. Otherwise, the item is set to a reducing lateral, a reducing tap, a wye-type fitting, or other appropriate fitting, depending upon the user's settings. If the "start from" item is a Tee, the "start from" item is set to a cross, a lateral cross, or other appropriate fitting depending upon the angle and the user's settings. If the "start from" item is a reducing Tee, the "start from" item is set to a reducing cross or a reducing lateral cross depending upon the angle and the user's settings. In another alternative, if the "start from" item is a lateral/wye, the "start from" item is set to a lateral cross-type fitting. If the "start from" item is a reducing lateral/wye, the "start from" item is set to a reducing lateral cross-type fitting. In still another alternative, if the "start from" item is a 90° elbow, the "start from" item is set to a Tee, a lateral or a wye-type fitting depending upon the angle and the user's settings. If the "start from" item is a reducing 90° elbow, the "start from" item is set to a reducing Tee, a reducing lateral or a wye-type fitting depending upon the angle and the user's settings. Further, if the "start from" item is any other degree non-reducing elbow, the "start from" item is set to a lateral or a wye-type fitting depending upon the angle and the user's settings. Finally, if the "start from" item is any other degree reducing elbow, the "start from" item is set to a reducing lateral or a wye-type fitting depending upon the angle and the user's settings.

Still another important feature of the invention is the ability to remove and replace a drawing from digitizing tablet 48 at any time so that the user can enter data from the drawing at different sessions. This occurs by having the computer store the original orientation of the drawing on digitizing tablet 48. To reorient the drawing when replaced on digitizing tablet 48, the user simply touches two points on the drawing with pointer 22 that were previously stored in the computer. The user then begins touching points on the drawing to transfer the information as previously described. Based on coordinates for the two points that were touched, the processor develops a transformation procedure so that each additional point that is touched will be transformed to coordinates associated with the original orientation of the drawing.

Figure 8:
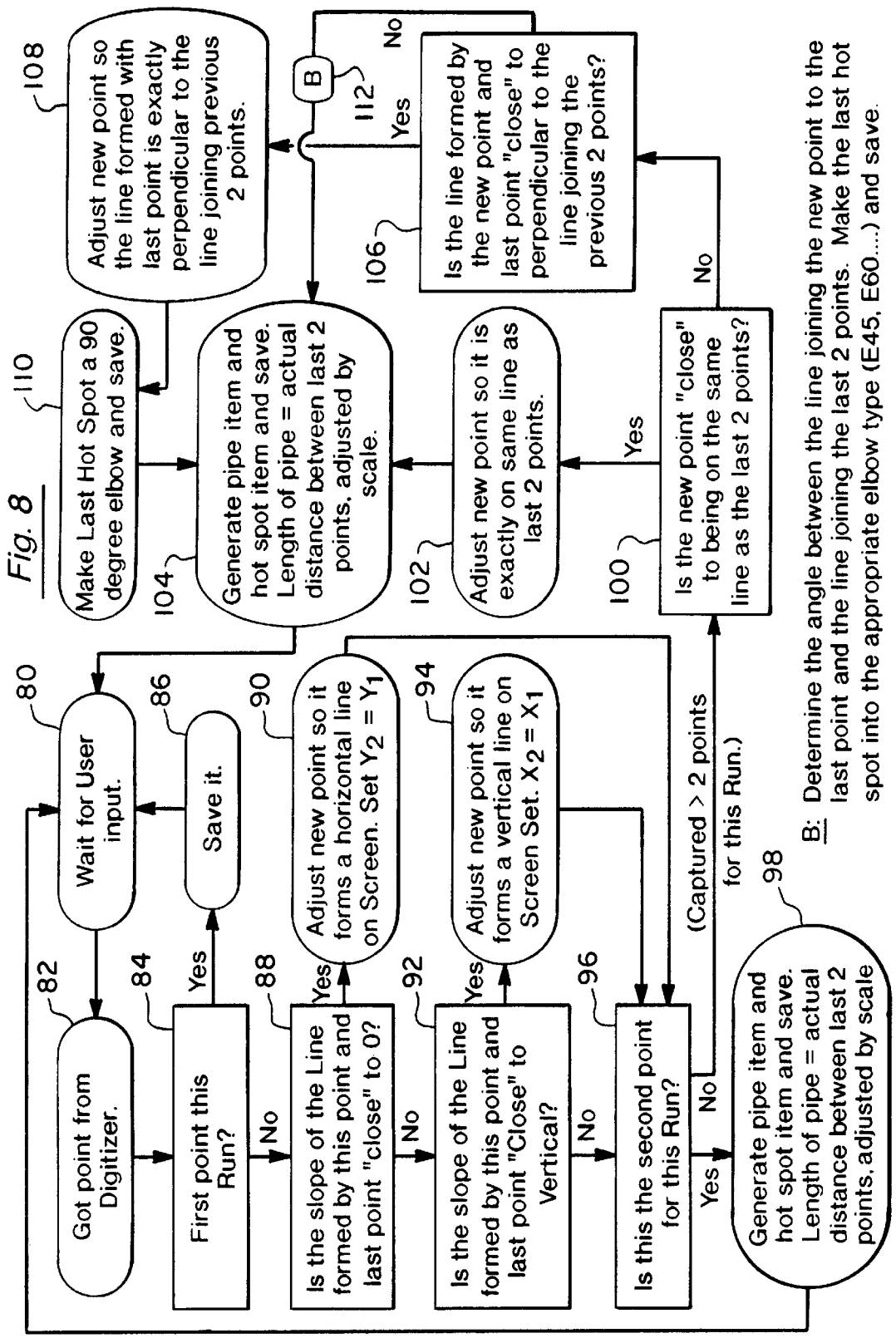
FIG. 8 is a flow chart of a method employed by a computer to display items from a drawing and to calculate the appropriate fittings.

Referring now to FIG. 8, operation of system 10 to visually display the drawing and to calculate the necessary fittings will be described. Initially, system 10 waits for user input as shown in step 80. Such input may include, for example, the name of the item and its cross-sectional dimensions, or simply just the dimension of the item. System 10 then obtains a first point from the digitizer as illustrated in step 82. System 10 then determines whether this is the first point for the run as shown in step 84. If this is the first point, the point is saved as shown in step 86 and the system then waits for another point from the digitizer as shown in step 82. Once more than one point has been entered, system 10 determines whether the slope of the line formed by the last two points is near zero as shown in step 88. If so, the new point is adjusted so that it forms a horizontal line on the display screen as shown in step 90. If not, the processor inquires as to whether the two points are close to vertical as shown step 92. If so, the new point is adjusted so that it forms a vertical line on the display screen as shown in step 94. The processor then inquires as to whether this is the second point for this run as shown in step 96. If the last entered point is the second point an item is generated (such as a pipe) and a hot spot indicator is displayed as shown in step 98. This information is saved and the length of the pipe is set equal to the actual distance between the last two points, adjusted by an appropriate scale. The user is then directed back to step 80 and is allowed to enter additional points.

If the last entered point is not the second point from the run, i.e. when more than two points have been entered for the run, the method proceeds to step 100 where the processor inquires as to whether the new point is near the line connecting the last points. If so, the new point is adjusted so that it is on the same line as the last two points as shown in step 102. A pipe item is then generated and a hot spot indicator displayed as shown in step 104. The user is then directed back to step 80 to enter additional points.

If the answer to step 100 is no, the processor inquires as to whether the line formed by the new point and the last point are nearly perpendicular to the line joining the previous two points as shown in step 106. If the line is perpendicular, the new point is adjusted so that the line formed with the last point is exactly perpendicular to the line joining the previous two points as shown in step 108. A hot spot indicator is then displayed at this last point and a 90° elbow is placed between the two lines. This information is then saved as shown in step 110. The method then proceeds to step 104 where another pipe item is generated.

If the answer to step 106 is no, then the method proceeds to step 112 where the processor determines the angle between the line joining the new point to the last point and the line joining the last two points. The last point is then provided with a hot spot indicator and an appropriate elbow-type, e.g. a 45° elbow, a 60° elbow, or the like, is provided and the information is saved. The user then proceeds to step 104 where the appropriate pipe item is generated. The user is then directed back to step 80 to allow additional points to be selected.

Hence, the user may continue to select points with system 10 both generating the appropriate items and connecting fittings and displaying them on the display screen with appropriate hot spot indicators until all information has been entered. Based on this information, system 10 may then produce an appropriate bid estimate for the generated data.

Figure 9:
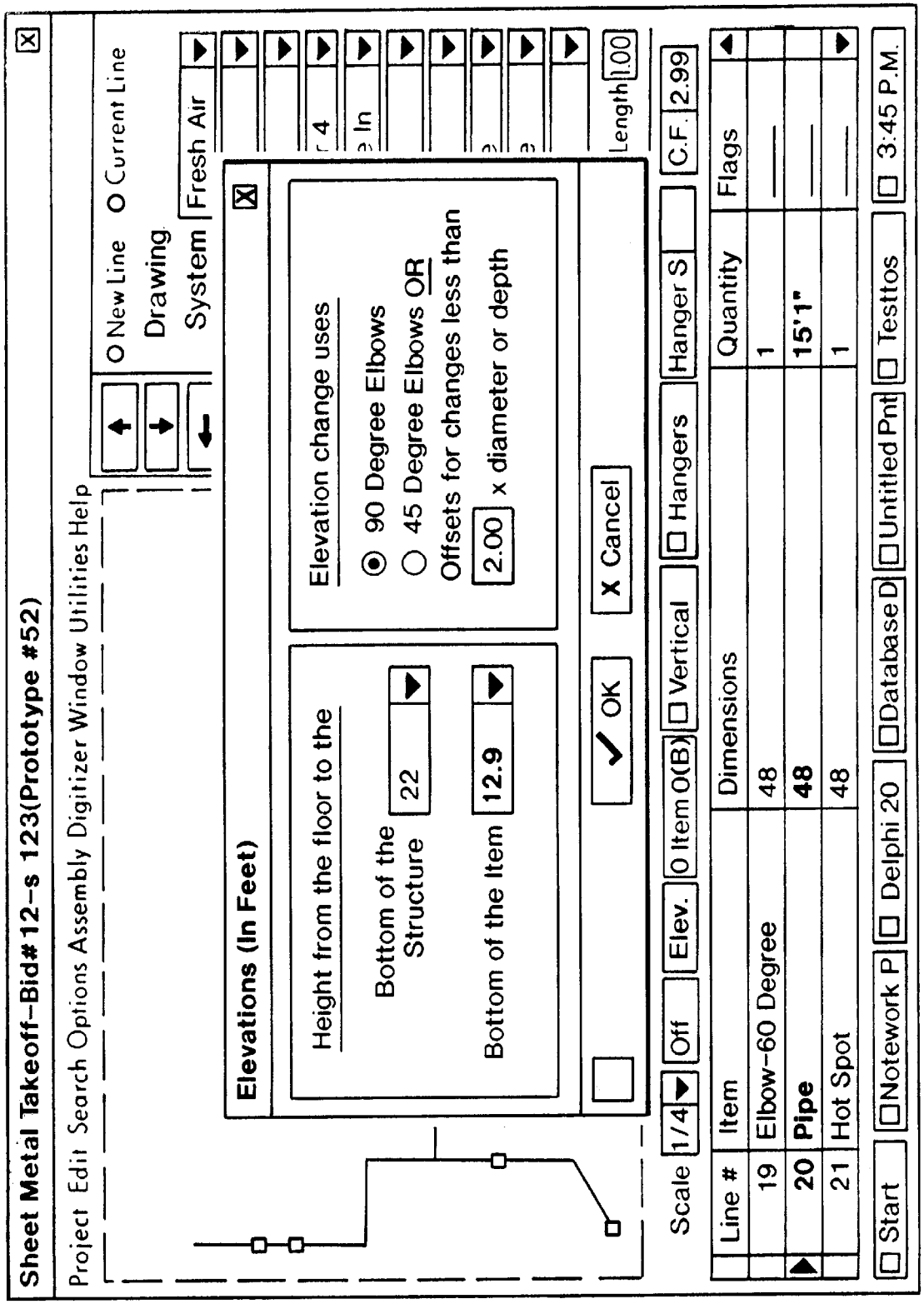
FIG. 9 is a further window from the display screen which allows for the input of item installment height information.

Still another important feature of the invention is the ability to change the bid estimate based on the ease or difficulty in installing the items. One example of such a feature will be described with reference to FIG. 9 which illustrates a height adjustment window 120. Window 120 may be pulled down from the home window and allows the user to enter both the height from the floor to the bottom of the structure and the height from the floor to the bottom of the item. In this manner, system 10 will know how high the item is to be suspended from the floor relative to the overall height of the structure. Based on this information, system 10 will adjust the amount of labor and determines the necessary peripherals required to install the items at the entered height. This information will then be placed into the bid estimate.

System 10 also allows for various other correction factors as illustrated in FIG. 10. The default setting for each correction factor is 1.0 which may be increased or decreased to modify the cost estimate. For example, when changed from 1.0 to 1.01 a 1% increase is added. Various correction factors may be provided depending upon the particular project and can be conveniently categorized as shown in a correction factor window 122 of FIG. 10. Window 122 includes field installation correction factors, such as weather, the particular floor, the elevation, congestion, and the like. Field material handling correction factors include weather, the floor height, congestion and the like. Once the appropriate default settings have been determined, each time an item is generated the appropriate correction factors will be looked up and factored into the bid estimate.

Some correction factors are automatically determined by the processor based on other entered data. For example, when a user selects a particular floor or elevation, the processor will determine the necessary correction factors that relate to the selected floor and elevation.

Figure 11:
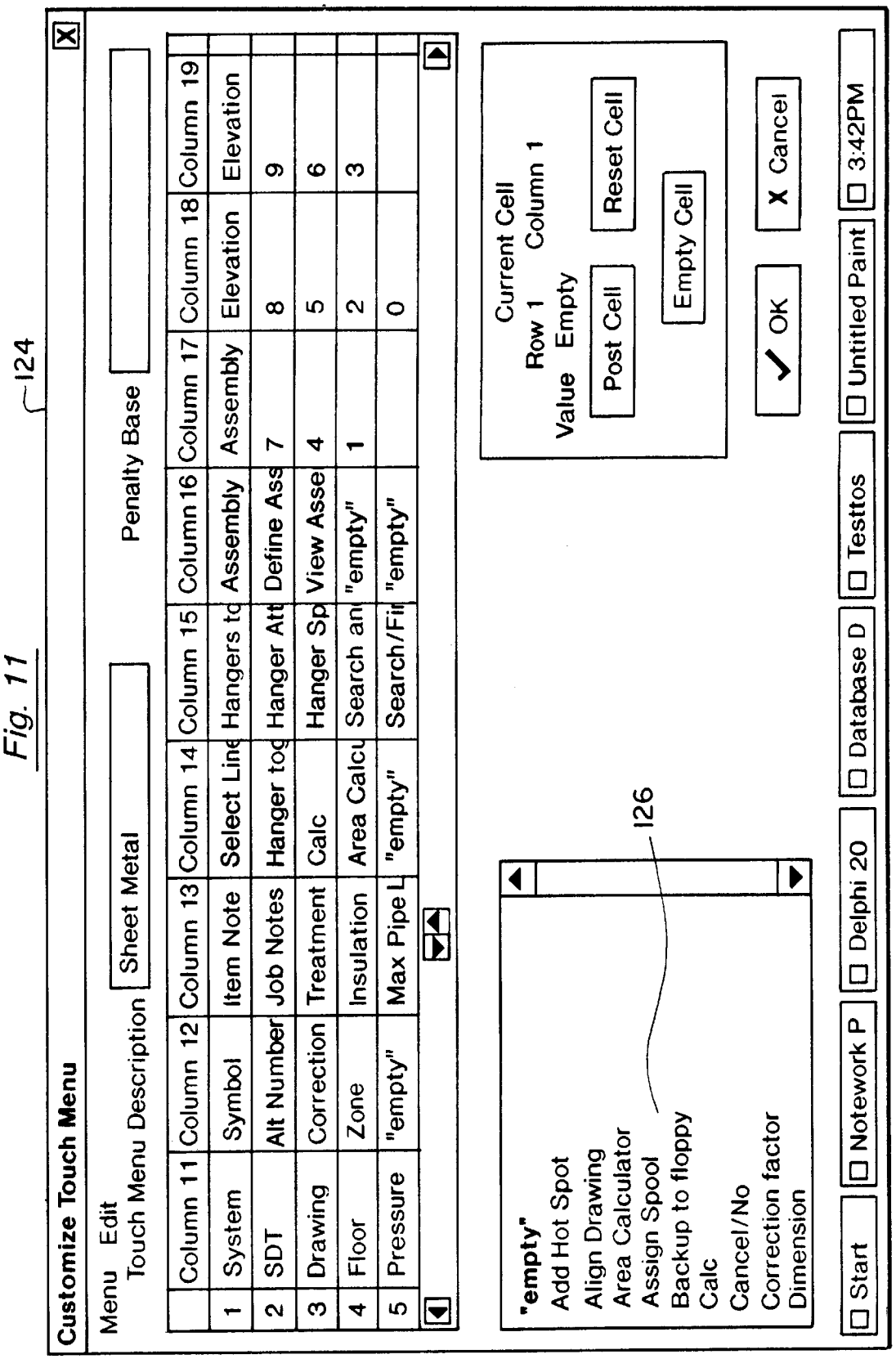
FIG. 11 is yet another window from the display screen which allows a user to customize an input menu according to the invention.

Referring now to FIG. 11, a window 124 which allows a user to customize digitizer menu 48 (see FIG. 1) will be described. As shown, window 124 includes a region having columns and rows of cells which correspond to data portion 52 of digitizer menu 48. Window 124 includes a pick list section 126 which allows the user to fill the highlighted cell with the desired menu item. Once the desired cells have been filled, the menu may be printed and used in connection with pointer 22 and digitizing tablet 48 as previously described.

Figure 12:
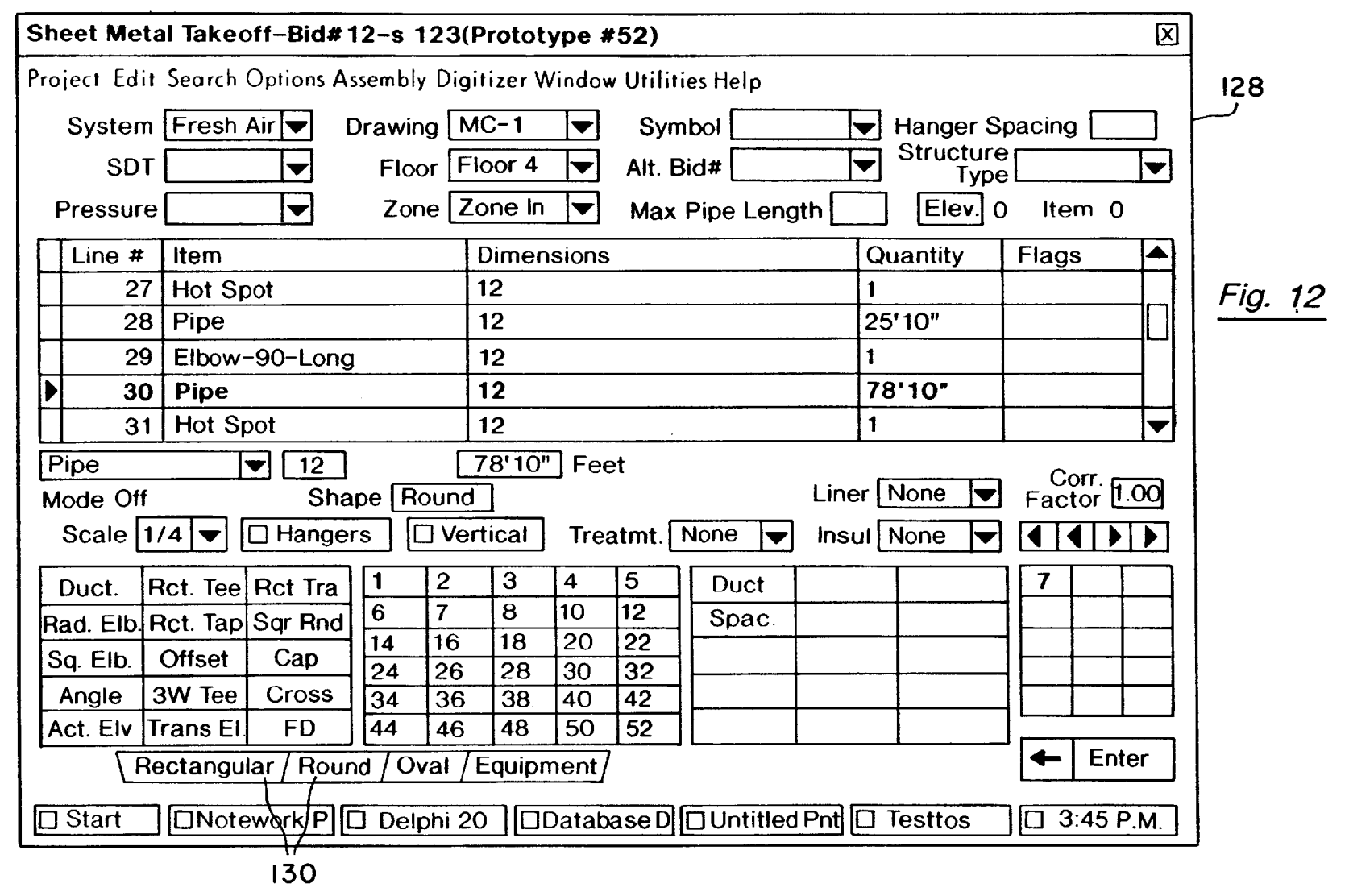

Instead of relying upon pointer 22 to enter information from digitizing tablet 48, information may also be entered into computer 12 through mouse 18 and/or keyboard 16. Shown in FIG. 12 is an alternate window 128 which allows various information to be entered by selecting the items which are shown on display screen 14. For example, instead of having system 10 automatically calculate the necessary fittings, mouse 18 may be employed to move a cursor to select an appropriate fitting which is shown in window 128. Window 128 further includes a plurality of tabs 130 which allow the user to display additional information on window 128 that may be entered using mouse 18. In this manner, an alternative way is provided for entering the appropriate information into system 10 so that a bid estimate may be produced without needing to rely upon pointer 22 and digitizing tablet 48.

For convenience, system 10 allows a user to customize window 28 by employing a customized menu 132 as shown in FIG. 13. From a pick list 134 the user may fill the appropriate cells for each tab. In this way, the user will have a menu which is customized to a particular job and may easily select the desired items, their respective sizes and the necessary fittings from window 128. As previously described, the necessary peripherals will be automatically calculated by system 10 when using window 128 to produce the bid estimate.

A further feature of the invention is the option of allowing current specifications from the architects, engineers and the like entered into system 10. Any items, peripherals, connectors, and the like that are used in the bid will then be compared with the entered specifications. If there are any discrepancies, these will be flagged and a suggested replacement provided so that current specifications will be met.

Another feature of the invention is that it may be employed as a labor tracking tool. For example, after being awarded a job, the contractor will begin installing the various items. As these are installed, the actual labor costs required for installment may be entered into the computer. The actual labor values may then be compared with the estimated values that were used to obtain the job. Based on this information, more accurate bids may be produced for future proposals.

The invention has now been described in detail for purposes of clarity and understanding. Although several illustrated examples of methods for practicing the invention are described above, these examples are by no means exhaustive of all possible means for practicing the invention. The scope of the invention should therefore be determined with reference to the appended claims, along with a full range of equivalents to which those claims are entitled.

What is claimed is:

1. A method for producing a bid from at least one drawing including various items to be included in the bid, the method employing a computer having a display screen, an entry device and a processor coupled to the display screen and the entry device, the method comprising:

entering into the processor at least one characteristic of a first item on the drawing;

entering into the processor at least one characteristic of a second item on the drawing;

the processor selecting a fitting which connects the first and the second items based on the entered characteristics, wherein the fitting is selected from a group of fittings consisting of fittings accommodating a change in dimension between the two items, fittings accommodating a chance in direction between the two items, and fittings accommodating the connection of one or more additional items to the two items; and producing a bid amount based at least in part on the cost of the first item, the second item, and the fitting.

2. A method as in claim 1, wherein the entering steps comprise entering the cross sectional size.

3. A method as in claim 2, wherein the entering steps further comprise moving the entry device near to the first and the second items to transfer to the processor the length of the items or the area of the items.

4. A method as in claim 3, further comprising transferring information from the drawings to the processor relating to the positions of the two items relative to each other.

5. A method as in claim 4, wherein the entry device comprises a digitizing tablet upon which the drawing is placed and a pointer, wherein each item includes end points, and wherein the pointer is passed over the end points to transfer the lengths and positions of the items to the processor.

6. A method as in claim 3, further comprising producing an image of the items on the display screen in real time as they are transferred to the processor from the drawing.

7. A method as in claim 1, producing a written description of the items and the fitting on the display screen.

8. A method as in claim 1, further comprising determining peripherals needed to install the items in a building.

9. A method as in claim 8, wherein the peripherals are selected from the group of peripherals consisting of connectors, hangers, liners, treatments, and insulation.

10. A method as in claim 1, wherein the type of fitting is selected based on a change of elevation between the two items.

11. A method as in claim 10, further comprising selecting a pair of fittings and a third item which connect the two items when there is a change of elevation between the two items.

12. A method as in claim 1, wherein the type of fitting is selected based on a change of dimension between the two items.

13. A method as in claim 1, wherein more than one item is to be connected to one of the items, and wherein the type of fitting is selected based on the number of items to be joined together.

14. A method as in claim 1, further comprising displaying indicators on the display screen at locations where other fittings are to be included.

15. A method as in claim 14, further comprising removing each indicator from the display screen when at least two items which are to be joined to the fitting are entered into the processor and the processor has selected the fitting.

16. A method as in claim 15, further comprising entering into the processor information indicating that at least a third item is to be joined to the fitting, wherein the processor selects a modified fitting for the at least three items.

17. A method as in claim 1, wherein the items are selected from a group of items consisting of ducts, pipes, electrical conduits, cables, walls, trenching, fencing, and curb and gutter.

18. A method as in claim 1, wherein the bid amount is further based on labor costs required to install the items and the fittings, and wherein the labor costs are calculated by the processor.

19. A method as in claim 18, further comprising adjusting the labor costs based on the height of the items from a floor of the building.

20. A method as in claim 1, wherein the fitting is selected from a list of fittings that are stored in the computer based the entered characteristics.

21. A method as in claim 2, further comprising moving the entry device near additional items on the drawings to transfer information identifying characteristics of the additional items into the processor, wherein the processor selects fittings to connect the additional items.

22. A method as in claim 1, wherein at least some of the items comprise standard sized sections which are attached by connectors, and wherein the processor selects the type of fitting to allow the item to be formed from only standard sized sections.

23. A method for estimating building materials needed for a project from at least one drawing including various items to be included in the project, the method employing a computer having a display screen, an entry device and a processor coupled to the display screen and the entry device, the method comprising:

entering into the processor at least one characteristic of a first item on the drawing;

entering into the processor at least one characteristic of a second item on the drawing;

the processor selecting a fitting which connects the first and the second items based on the entered characteristics, wherein the fitting is selected from a group of fittings consisting of fittings accommodating a change in dimension between the two items, fittings accommodating a chance in direction between the two items, and fittings accommodating the connection of one or more additional items to the two items; and displaying in real time on the display screen an image representative of the first and the second items.

24. A method as in claim 23, wherein the entering steps comprise entering the cross sectional size.

25. A method as in claim 24, wherein the entry device comprises a digitizing tablet and a pointer, and wherein the entering steps further comprise placing the drawing on the digitizing tablet and moving the pointer near to the first and the second items to transfer to the processor the length of the items and their positions relative to each other.

26. A method as in claim 23, further comprising producing a bid amount based at least in part on a cost of the first item, the second item, and the fitting.

27. An estimating system, comprising:

at least one drawing having various items to be included within an estimate; and a computer having a display screen, an entry device and a processor coupled to the display screen and the entry device, wherein the entry device may be employed to transfer information identifying characteristics of the various items from the drawing to the processor;

wherein said processor selects a fitting for connecting at least two items which have been entered into the processor, wherein the fitting is selected from a group of fittings consisting of fittings accommodating a change in dimension between the two items, fittings accommodating a change in direction between the two items, and fittings accommodating the connection of one or more additional items to the two items.

28. A system as in claim 27, wherein the entry device comprises a keyboard.

29. A system as in claim 27, wherein the entry device comprises a digitizing tablet upon which the drawing is placed and a pointer to directly read information from the drawing.

30. A system as in claim 29, wherein the identifying characteristics comprise the cross sectional size and shape of the items.

31. A system as in claim 30, wherein the identifying characteristics further comprise the lengths of the items which are transferred by moving the pointer near two ends of the item.

32. A system as in claim 31, wherein the digitizing tablet further transfers information from the drawings to the processor indicating the positions of the two items relative to each other.

33. A system as in claim 32, wherein each item includes end points, and wherein the pointer is passed over the end points to transfer the lengths and positions of the items to the processor.

34. A system as in claim 27, wherein the processor causes an image of the items to be produced on the display screen in real time as they are transferred to the processor from the drawing.

35. A system as in claim 27, wherein the processor causes a written description of the items and the fitting to be produced on the display screen.

36. A system as in claim 27, wherein the processor determines peripherals needed to install the items in or on a building or underground.

37. A system as in claim 36, wherein the peripherals are selected from a group of peripherals consisting of connectors, hangers, liners, treatments, and insulation.

38. A system as in claim 27, wherein the processor determines the type of fitting based on a change of elevation between the two items.

39. A system as in claim 27, wherein processor determines the type of fitting based on a change of dimension between the two items.

40. A system as in claim 27, wherein more than one item is to be connected to one of the items, and wherein the processor determines the type of fitting based on the number of items to be joined together, their relative sizes and their relative positions.

41. A system as in claim 27, wherein the processor causes indicators to be displayed on the display screen at locations where other fittings are to be included.

42. A system as in claim 41, wherein the processor causes each indicator to be removed from the display screen when at least two items which are to be joined to the fitting are entered into the processor and the processor has selected the fitting.

43. A system as in claim 27, wherein the processor selects a modified fitting upon receiving an entry of information indicating that a third item is to be joined to the fitting.

44. A system as in claim 27, wherein the items are selected from a group of items consisting of ducts, pipes, electrical conduits, cables, and walls.

45. A system as in claim 27, wherein the computer includes information on the cost of the items and the fitting and the labor costs required to install the items and the fittings, and wherein the processor produces a bid amount based at least in part on the costs of the items, the cost of the fitting and the labor costs.

46. A system as in claim 45, wherein the processor adjusts the labor costs based on the height of the items from a floor of the building.

47. A system as in claim 27, wherein the processor selects the fitting from a list of fittings that are stored in the computer based at least on part on the shape and the size of the items to be attached.

48. A system as in claim 27, wherein at least some of the items comprise standard sized sections which are attached by connectors, and wherein the processor adjusts the type of fitting to allow the item to be formed from only standard sized sections.

49. A computer program product for generating fittings which connect a plurality of items, comprising:
    computer code that receives as input a first set of instructions, said first set of instructions including a characteristic of at least two items which are to be connected;
    computer code that generates a fitting to join said at least two items based on said first set of instructions, wherein the fitting is selected from a group of fittings consisting of fittings accommodating a chance in dimension between the two items, fittings accommodating a chance in direction between the two items, and fittings accommodating the connection of one or more additional items to the two items; and
    a computer readable medium that stores the computer codes.

50. A method for producing a bid from at least one drawing including various items to be included in the bid, the method employing a computer having a display screen, an entry device and a processor coupled to the display screen and the entry device, the method comprising:
    entering into the processor at least one characteristic of a first item on the drawing;
    entering into the processor at least one characteristic of a second item on the drawing;
    the processor selecting a fitting which connects the first and the second items based on the entered characteristics;
    producing a bid amount based at least in part on the cost of the first item, the second item, and the fitting; and
    determining peripherals needed to install the items in a building, wherein the peripherals are selected from the group of peripherals consisting of connectors, hangers, liners, treatments, and insulation.

51. A method for producing a bid from at least one drawing including various items to be included in the bid, wherein the items are selected from a group of items consisting of ducts, pipes, electrical conduits, cables, walls, trenching, fencing, and curb and gutter, the method employing a computer having a display screen, an entry device and a processor coupled to the display screen and the entry device, the method comprising:
    entering into the processor at least one characteristic of a first item on the drawing;
    entering into the processor at least one characteristic of a second item on the drawing;
    the processor selecting a fitting which connects the first and the second items based on the entered characteristics;
    producing a bid amount based at least in part on the cost of the first item, the second item, and the fitting.

52. An estimating system, comprising:
    at least one drawing having various items to be included within an estimate; and
    a computer having a display screen, an entry device and a processor coupled to the display screen and the entry device, wherein the entry device may be employed to transfer information identifying characteristics of the various items from the drawing to the processor;
    wherein said processor selects a fitting for connecting at least two items which have been entered into the processor, and wherein the processor causes indicators to be displayed on the display screen at locations where other fittings are to be included.

53. An estimating system, comprising:
    at least one drawing having various items to be included within an estimate; and
    a computer having a display screen, an entry device and a processor coupled to the display screen and the entry device, wherein the entry device may be employed to transfer information identifying characteristics of the various items from the drawing to the processor;
    wherein said processor selects a fitting for connecting at least two items which have been entered into the processor, and wherein the processor selects a modified fitting upon receiving an entry of information indicating that a third item is to be joined to the fitting.

54. An estimating system, comprising:
    at least one drawing having various items to be included within an estimate; and
    a computer having a display screen, an entry device and a processor coupled to the display screen and the entry device, wherein the entry device may be employed to transfer information identifying characteristics of the various items from the drawing to the processor;
    wherein said processor selects a fitting for connecting at least two items which have been entered into the processor, and wherein the items are selected from a group of items consisting of ducts, pipes, electrical conduits, cables, and walls.

55. An estimating system, comprising:
    at least one drawing having various items to be included within an estimate; and
    a computer having a display screen, an entry device and a processor coupled to the display screen and the entry device, wherein the entry device may be employed to transfer information identifying characteristics of the various items from the drawing to the processor;
    wherein said processor selects a fitting for connecting at least two items which have been entered into the processor, wherein the processor selects the fitting from a list of fittings that are stored in the computer based at least in part on the shape and the size of the items to be attached.

* * * * *